(12) United States Patent
Dionne et al.

(10) Patent No.: US 9,836,879 B2
(45) Date of Patent: Dec. 5, 2017

(54) MESH SKINNING TECHNIQUE

(71) Applicant: AUTODESK, INC., San Rafael, CA (US)

(72) Inventors: Olivier Dionne, Montreal (CA); Martin De Lasa, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 166 days.

(21) Appl. No.: 14/251,522

(22) Filed: Apr. 11, 2014

(65) Prior Publication Data
US 2014/0306962 A1 Oct. 16, 2014

Related U.S. Application Data

(60) Provisional application No. 61/812,699, filed on Apr. 16, 2013.

(51) Int. Cl.
*G06T 17/00* (2006.01)
*G06T 15/04* (2011.01)

(52) U.S. Cl.
CPC .............. *G06T 17/00* (2013.01); *G06T 15/04* (2013.01)

(58) Field of Classification Search
None
See application file for complete search history.

(56) References Cited

U.S. PATENT DOCUMENTS

| 5,912,675 | A | * | 6/1999 | Laperriere | G06T 13/20 345/473 |
| 6,867,774 | B1 | * | 3/2005 | Halmshaw | G06T 15/08 345/424 |
| 7,167,180 | B1 | * | 1/2007 | Shibolet | G06T 7/155 345/418 |
| 8,531,464 | B1 | * | 9/2013 | Cohen Bengio | G06T 13/40 345/419 |

(Continued)

OTHER PUBLICATIONS

Hilaga et al., Topology Matching for Fully Automatic Similarity Estimation of 3D Shapes, Aug. 2001, ACM Proceedings of the 28th Annual Conference on Computer Graphics and Interactive Techniques, pp. 203-212.*

(Continued)

*Primary Examiner* — Anh-Tuan V Nguyen
(74) *Attorney, Agent, or Firm* — Artegis Law Group, LLP

(57) ABSTRACT

A computer-implemented method for computing skinning weights. The method includes traversing one or more paths from a first voxel included in a voxelization associated with a three-dimensional model to a second voxel included in the voxelization. The first voxel intersects a first influence included in the three-dimensional model. The second voxel intersects a target vertex associated with the three-dimensional model. The voxelization includes a set of interior voxels. The first voxel and the second voxel are included in the set of interior voxels. The method also includes identifying a first path included in the one or more paths that is associated with a first distance value related to the second voxel that indicates that the first path represents the shortest (Continued)

distance between the first voxel and the second voxel. The method further includes assigning a skinning weight to the target vertex based on the first distance value.

20 Claims, 8 Drawing Sheets

(56) References Cited

U.S. PATENT DOCUMENTS

| | | | | |
|---|---|---|---|---|
| 2004/0109603 | A1* | 6/2004 | Bitter | G06T 7/64 382/154 |
| 2004/0227761 | A1* | 11/2004 | Anderson | G06T 13/40 345/473 |
| 2004/0249809 | A1* | 12/2004 | Ramani | G06F 17/30259 |
| 2007/0103464 | A1* | 5/2007 | Kaufman | G06T 7/0012 345/424 |
| 2007/0132757 | A1* | 6/2007 | Hassner | G06T 17/20 345/420 |
| 2007/0165917 | A1* | 7/2007 | Cao | G06K 9/4638 382/128 |
| 2008/0018646 | A1* | 1/2008 | Farag | G06T 7/64 345/424 |
| 2008/0309664 | A1* | 12/2008 | Zhou | G06T 13/40 345/420 |
| 2009/0067694 | A1* | 3/2009 | Shinagawa | G06K 9/469 382/128 |
| 2009/0232353 | A1* | 9/2009 | Sundaresan | G06K 9/00342 382/103 |
| 2010/0045674 | A1* | 2/2010 | Clifton | G06K 9/00201 345/424 |
| 2010/0134490 | A1* | 6/2010 | Corazza | G06T 17/20 345/420 |
| 2010/0296709 | A1* | 11/2010 | Ostrovsky-Berman | G06T 7/162 382/128 |
| 2010/0296718 | A1* | 11/2010 | Ostrovsky-Berman | G06T 7/187 382/133 |
| 2010/0321386 | A1* | 12/2010 | Lin | G06T 13/00 345/420 |
| 2011/0148865 | A1* | 6/2011 | Lim | G06T 13/40 345/419 |
| 2012/0019517 | A1* | 1/2012 | Corazza | G06T 13/40 345/419 |
| 2012/0203067 | A1* | 8/2012 | Higgins | A61B 1/00006 600/117 |
| 2012/0281019 | A1* | 11/2012 | Tamstorf | G06T 3/0093 345/646 |
| 2013/0088497 | A1* | 4/2013 | DiLorenzo | G06T 13/40 345/473 |
| 2013/0107003 | A1* | 5/2013 | Lim | G06T 13/40 348/46 |
| 2013/0176312 | A1* | 7/2013 | Schouwenburg | G06K 15/025 345/424 |
| 2013/0195330 | A1* | 8/2013 | Kim | G06K 9/00201 382/128 |
| 2013/0223706 | A1* | 8/2013 | Gremse | G06T 7/0012 382/128 |
| 2014/0232716 | A1* | 8/2014 | Wong | G06T 13/20 345/419 |
| 2014/0267252 | A1* | 9/2014 | Hutchinson | G06T 13/20 345/420 |
| 2014/0267268 | A1* | 9/2014 | Tipton | G06T 15/04 345/424 |

OTHER PUBLICATIONS

Madaras, Extraction of Skinning Data by Mesh Contraction with Collada 1.5 Support, May 2010, Proceedings of the 14th Central European Seminar on Computer Graphics, pp. 133-139.*

Bitter et al., Ceasar: A Smooth, Accurate and Robust Centerline Extraction Algorithm, 2000, IEEE Proceedings of the Conference on Visualization, pp. 45-53.*

* cited by examiner

MESH SKINNING TECHNIQUE

CROSS-REFERENCE TO RELATED APPLICATIONS

This application claims the priority benefit of the U.S. Provisional Patent Application having Ser. No. 61/812,699, filed on Apr. 16, 2013, which is hereby incorporated herein by reference.

BACKGROUND OF THE INVENTION

Field of the Invention

The present invention relates generally to computer aided design (CAD) applications and, in particular, to a mesh skinning technique.

Description of the Related Art

Three-dimensional animation generally involves creating a three-dimensional model or skin, creating a transformation hierarchy for that model, and binding the transformation hierarchy to the model. An animation is a sequence of translations for one or more influences in the transformation hierarchy. When the animation proceeds, the translations that are made to the influences in the transformation hierarchy cause the skin to deform.

Generally speaking, the degree to which any particular part of a skin deforms is related to a value known as a binding weight. Any particular portion of the skin may be affected by a particular influence to a greater or lesser degree based on the binding weight associated with that portion of skin and that particular influence.

Typically, binding weights are assigned manually. There are several drawbacks, however, with assigning binding weights manually. One drawback is that assigning weights is unintuitive, as the impact of assigning a particular weight for a particular pose of the model is not immediately clear to an animator. Another drawback is that assigning weights for a model is time consuming, as each vertex of a model must be assigned a weight.

As the foregoing illustrates, what is needed in the art are improved techniques for assigning skinning weights to a three-dimensional model.

SUMMARY OF THE INVENTION

One embodiment of the invention is a computer-implemented method for computing skinning weights. The method includes traversing one or more paths from a first voxel included in a voxelization associated with a three-dimensional model to a second voxel included in the voxelization, wherein the first voxel intersects a first influence included in the three-dimensional model, and the second voxel intersects a target vertex associated with the three-dimensional model, wherein the voxelization includes a set of interior voxels, and wherein the first voxel and the second voxel are included in the set of interior voxels. The method also includes identifying a first path included in the one or more paths that is associated with a first distance value related to the second voxel that indicates that the first path represents the shortest distance between the first voxel and the second voxel across the one or more paths. The method further includes assigning a skinning weight to the target vertex based on the first distance value.

One advantage of the disclosed techniques is that an application automatically generates skinning weights for skinning a three-dimensional model, which reduces the amount of time needed to animate models. Another advantage is that the techniques generate weights that produce improved deformations of model skins, which improves the quality of resulting animations.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
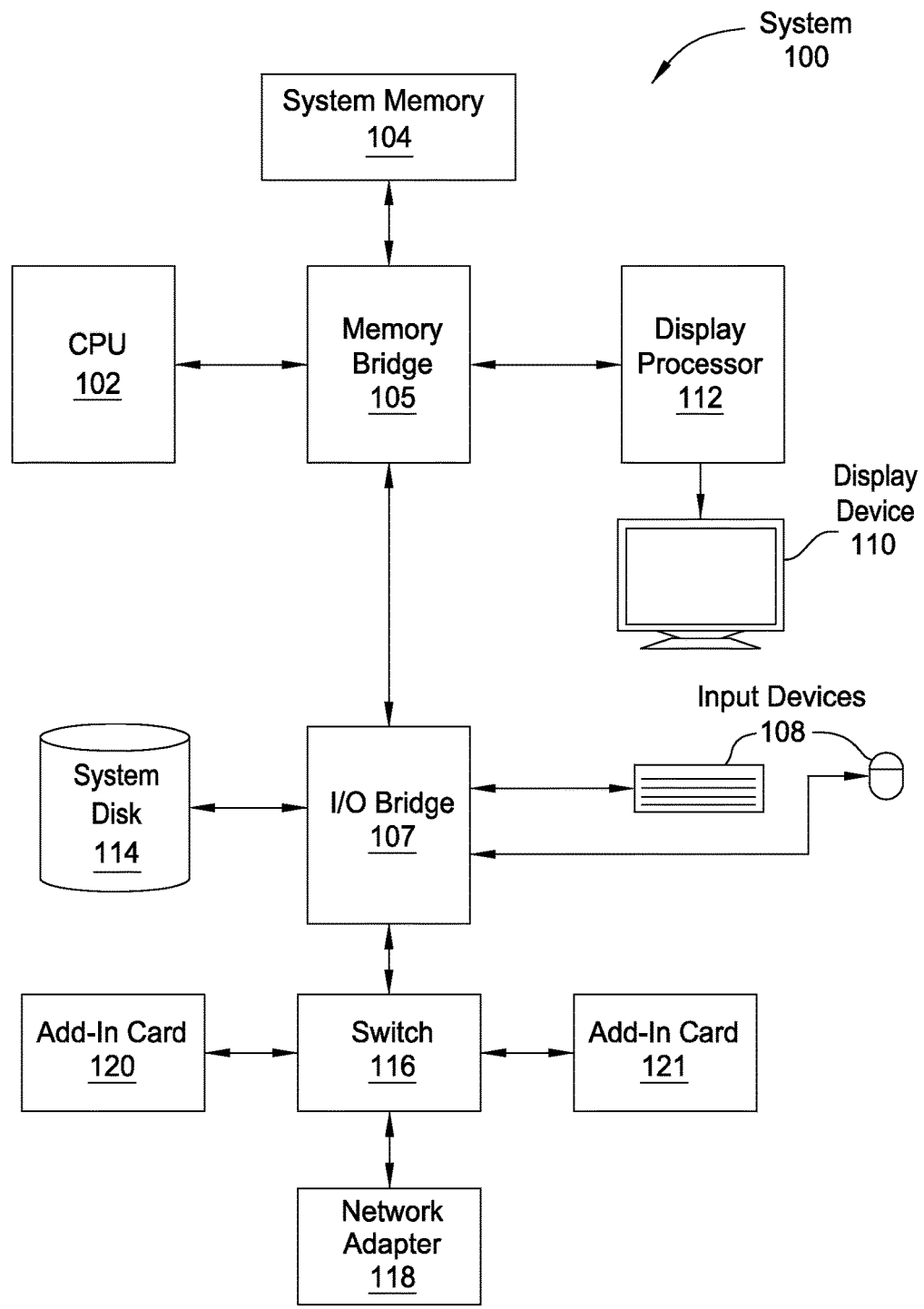
FIG. 1 is a block diagram of a system configured to implement one or more aspects of the present invention.

FIG. 1 is a block diagram of a system 100 configured to implement one or more aspects of the present invention. System 100 may be a computer workstation, personal computer, or any other device suitable for practicing one or more embodiments of the present invention. As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown).

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

In one embodiment, application 150 is stored in system memory 104. Application 150 may be any application configured to display a graphical user interface (GUI) on display device 110. Application 150 is configured to accept user input for generating and modifying a three-dimensional model, and to perform certain processing techniques on the three-dimensional model.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Skinning Weights for Vertex Deformation During
Model Animation

Figure 2A:
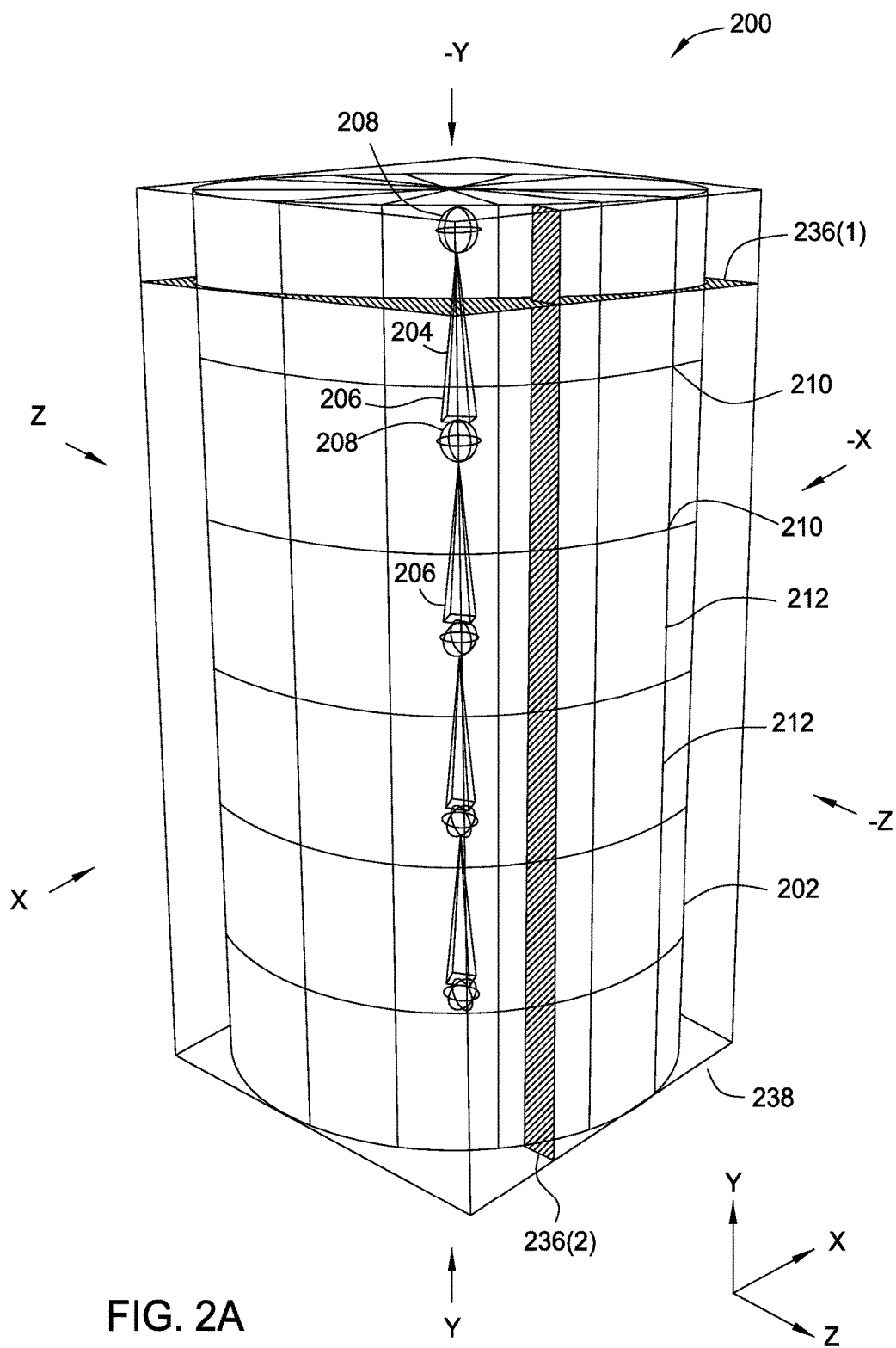
FIG. 2A is an illustration of a geometry model, according to one embodiment of the present invention.

FIG. 2A is an illustration of a geometry model 200, according to one embodiment of the present invention. As shown, the geometry model 200 includes a skin 202 and a transformation hierarchy 204 that is bound to the skin. The skin 202 is a mesh that includes vertices 210 and edges 212 that together define the mesh. The transformation hierarchy 204 is a hierarchy of influences 206 that may each influence the motion of vertices 210 within skin 202 during animation of the geometry model 200, as is generally known. In some embodiments, the transformation hierarchy 204 is a skeleton 204 that includes bones 206 and joints 208. In other embodiments, the transformation hierarchy 204 includes other types of influences, such as points, spheres, capsules, and other types of influences, as is generally known. The skin 202 is bound to the transformation hierarchy 204 so that movement of influences 206 in the transformation hierarchy 204 causes deformation of the skin 202. The skin occupies a bounding box 238 whose limits are defined by the maximum extent of the skin 202 in three orthogonal directions (x, y, and z). For purposes of illustration, the model 200 is a cylinder, which has simple geometry. However, those of skill in the art will understand that the techniques described herein can be applied to any geometry model. Further, in some embodiments, the geometry model 200 does not include the transformation hierarchy 204 of influences 206.

During animation of the model 200, application 150 applies a skin deformation algorithm to deform the skin 202 based on the movements of the influences 206. Generally speaking, skin deformation algorithms determine a modified position for each vertex 210 in the skin 202 based on transformations of influences 206 in the transformation hierarchy 204. In many techniques, the movements of one or more influences contribute to the modified position for any particular vertex. The amount that each influence contributes to the modified position of any particular vertex is based on a weight value that is associated with that particular influence-vertex combination. Thus, the modified position for any particular vertex 210 is based on the transformation amounts for one or more influences 206, each modified by a weight value.

Figure 2B:
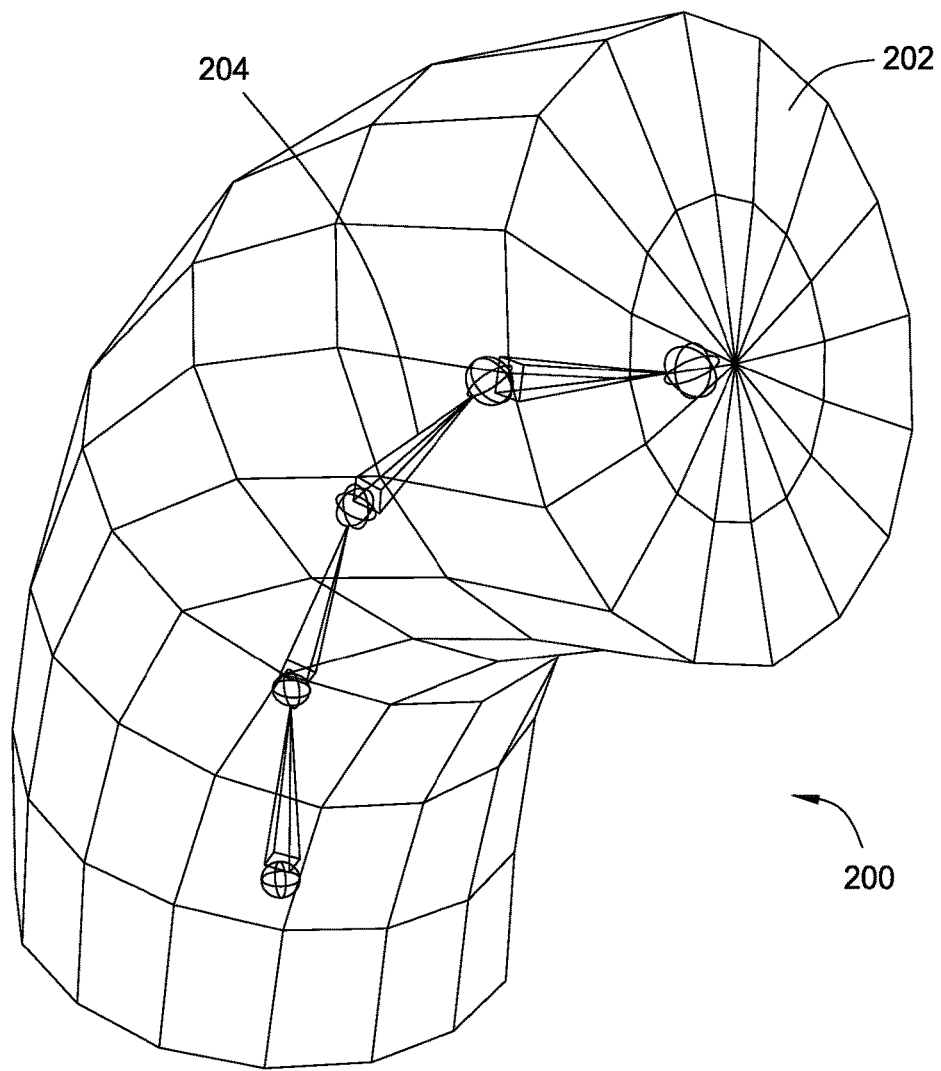
FIG. 2B is an illustration of a geometry model in a deformed state, according to one embodiment of the present invention.

FIG. 2B is an illustration of a geometry model 200 in a deformed state, according to one embodiment of the present invention. As shown, the deformed geometry model 200 includes the skin 202 and transformation hierarchy 204. Because the transformation hierarchy 204 is bound to the skin 202, moving the influences 206 of the transformation hierarchy 204 as shown, causes the skin 202 to deform in the manner shown. More specifically, as shown, vertices 210 of the skin 202 are moved based on the movements of the influences 206.

One example of a skin deformation algorithm is linear blend skinning (LBS). LBS calculates a modified position ($p_i'$) for each vertex 210 in the skin 202. The input to LBS includes a user-specified rest-pose mesh M (e.g., the skin 202) with the following vertex positions ($p_i$):

$$p_1, p_2, \ldots, p_n \in \mathfrak{R}^3$$

The input to LBS also includes a corresponding transformation hierarchy (e.g., transformation hierarchy 204) ($T_i$) specified as:

$$T_1, T_2, \ldots, T_m \in \mathfrak{R}^{3 \times 4}$$

LBS also accepts a weight function $\omega_j(p_i)$ that specifies the amount of influence a particular influence j has on vertex $p_i$ of the skin 202. Based on these inputs, LBS calculates modified position $p_i'$ for each vertex 210 as follows:

$$p_i' = \sum_{j}^{m} \omega_j(p_i) T_j \begin{bmatrix} p_i \\ 1 \end{bmatrix}$$

As is apparent from the equations presented above, the vertex positions $p_i$ are dependent on movement of the influences ($T_j$) as well as weight values ($\omega_j$). Described herein are techniques for automatically calculating weight values based on characteristics of the skin 202 and the transformation hierarchy 204. Application 150 implements such a technique. The technique generally involves two phases: 1) determining geodesic distances between each vertex in the skin 202 and each influence 206 in the transformation hierarchy, 204 based on a solid voxelization of a geometry model that indicates voxels that are interior to the geometry model and voxels that are exterior to the geometry model; and 2) defining a weight function $\omega_j(p_i)$ for each vertex based on the geodesic distances between each vertex and each influence. These two phases are now described in greater detail.

Calculating Geodesic Distance

Figure 3A:
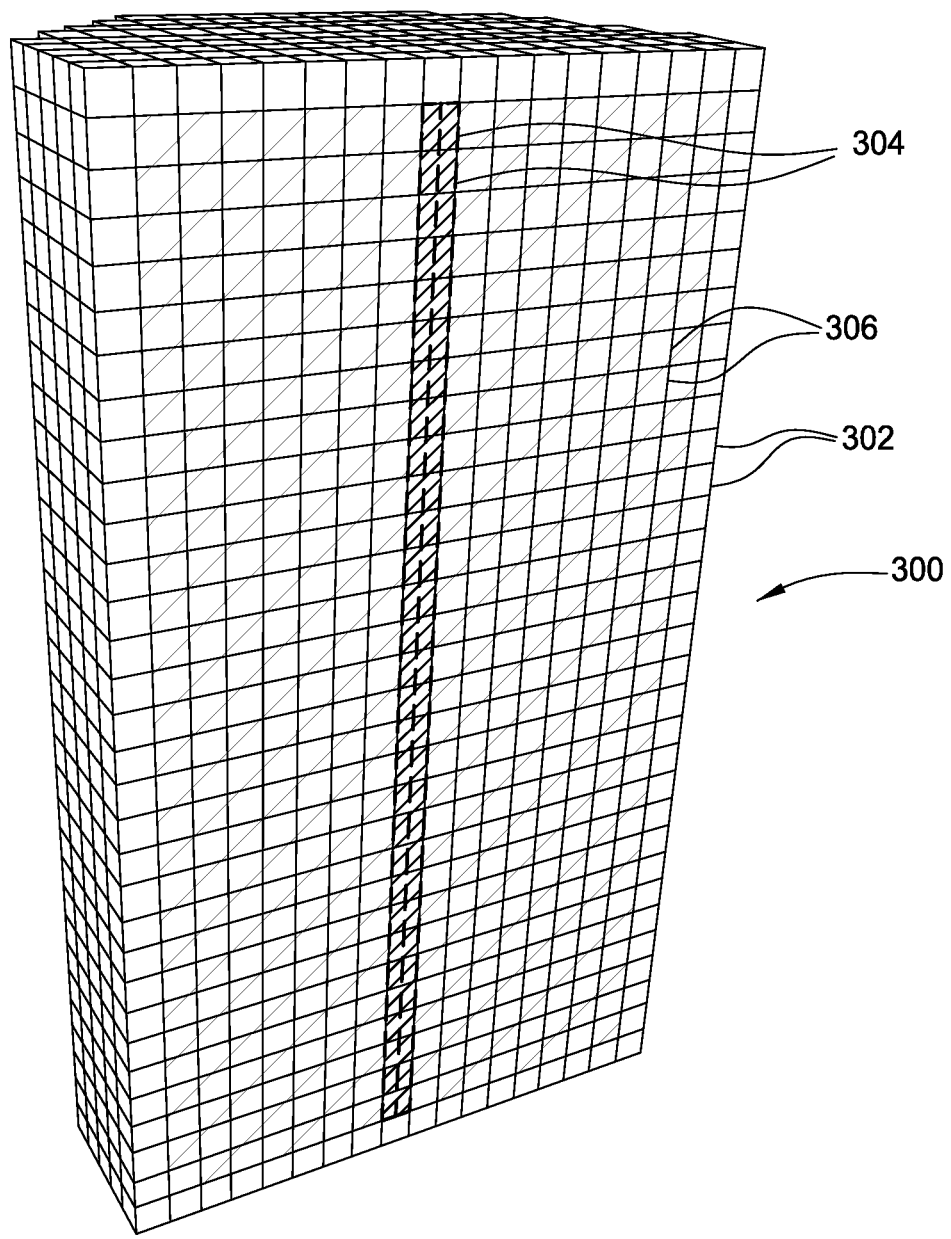
FIG. 3A is an illustration of a uniform voxelization of the geometry model of FIG. 2A, according to one embodiment of the present invention.

To calculate geodesic distances, application 150 begins with a voxelized representation of the geometric model, where such a voxelized representation includes voxels that are classified as internal (to the skin 202) or external (to the skin 202) voxels. Voxels may also be classified as voxels that intersect influencers 206 or voxels that intersect the skin 202. In one embodiment, the voxelization is a uniform voxelization (FIG. 3A). In another embodiment, the voxelization is a sparse voxelization (FIG. 3B).

FIG. 3A is an illustration of a uniform voxelization 300 of the geometry model 200 of FIG. 2A, according to one embodiment of the present invention. As shown, the uniform voxelization includes internal voxels 306, which include influencer voxels 304, and boundary voxels 302, as well as other internal voxels. For clarity, external voxels are not depicted in FIG. 3A.

Because the voxelization 300 is uniform, all voxels within the voxelization 300 are the same size. Boundary voxels 302 are voxels that intersect the skin 202 (FIG. 2A). Influencer voxels 304 are voxels that intersect influences 206 (FIG. 2A). Determining whether a particular voxel intersects a particular object (such as a vertex 210 or an influence 206) may be done with techniques known to those of skill in the art. For example, to test whether a point such as a vertex is within a voxel, the coordinates of the point are compared to the coordinates of the boundaries of the voxel. If the coordinates of the point are within the boundaries of the voxel in each dimension, then the point is considered to intersect the voxel.

Figure 3B:
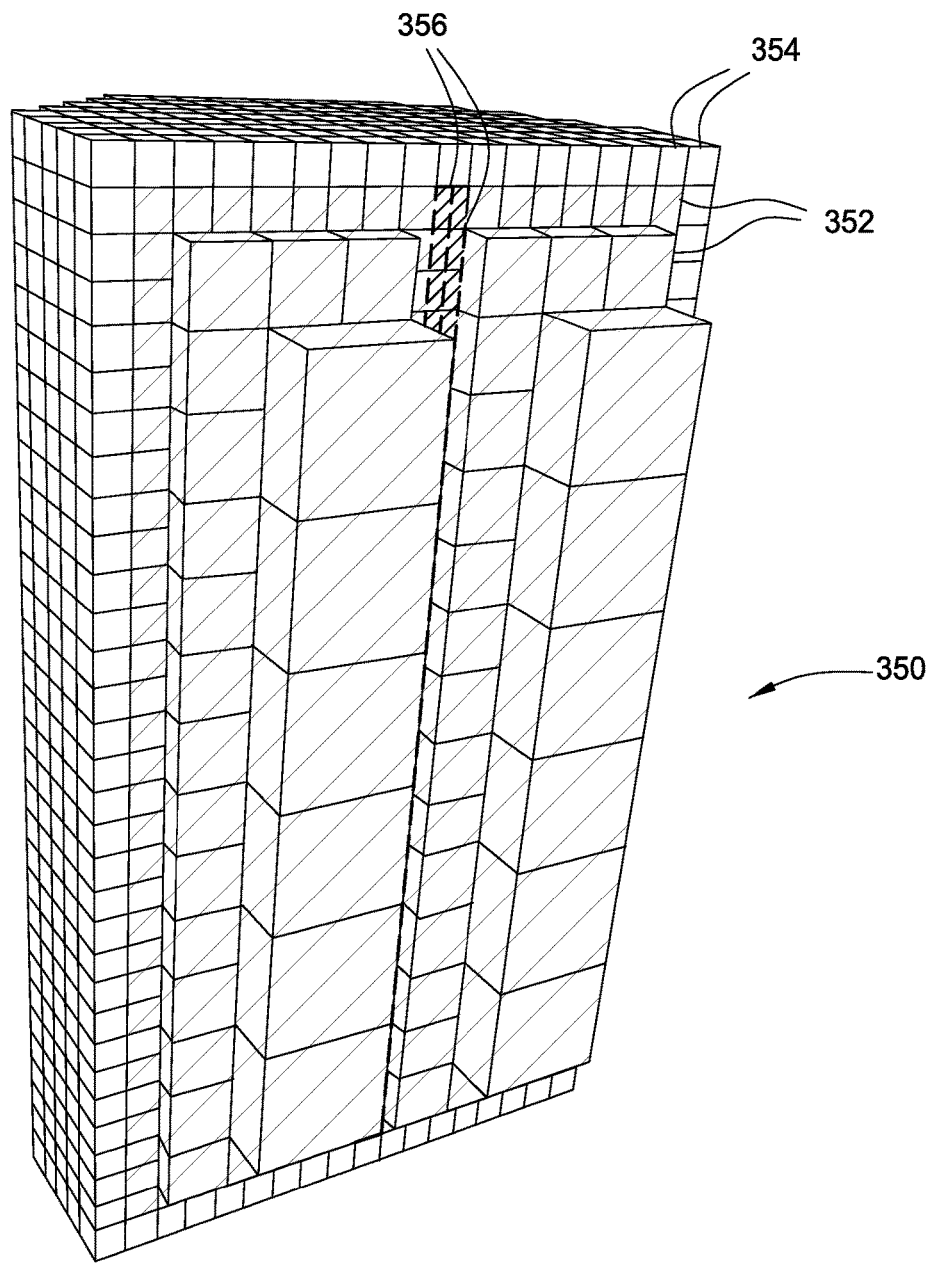
FIG. 3B is an illustration of a non-uniform, sparse voxelization of the geometry model of FIG. 2A, according to one embodiment of the present invention.

FIG. 3B is an illustration of a non-uniform, sparse voxelization 350 of the geometry model 200 of FIG. 2A, according to one embodiment of the present invention. As shown, the sparse voxelization 350 includes internal voxels 352, boundary voxels 354, and influencer voxels 356.

Because the voxelization is non-uniform, the voxels in the voxelization are different sizes. As described above, boundary voxels 354 are voxels that intersect with the skin 202 (FIG. 2A). Influencer voxels 356 are voxels that intersect the influences 206 (FIG. 2A).

Figure 4A:
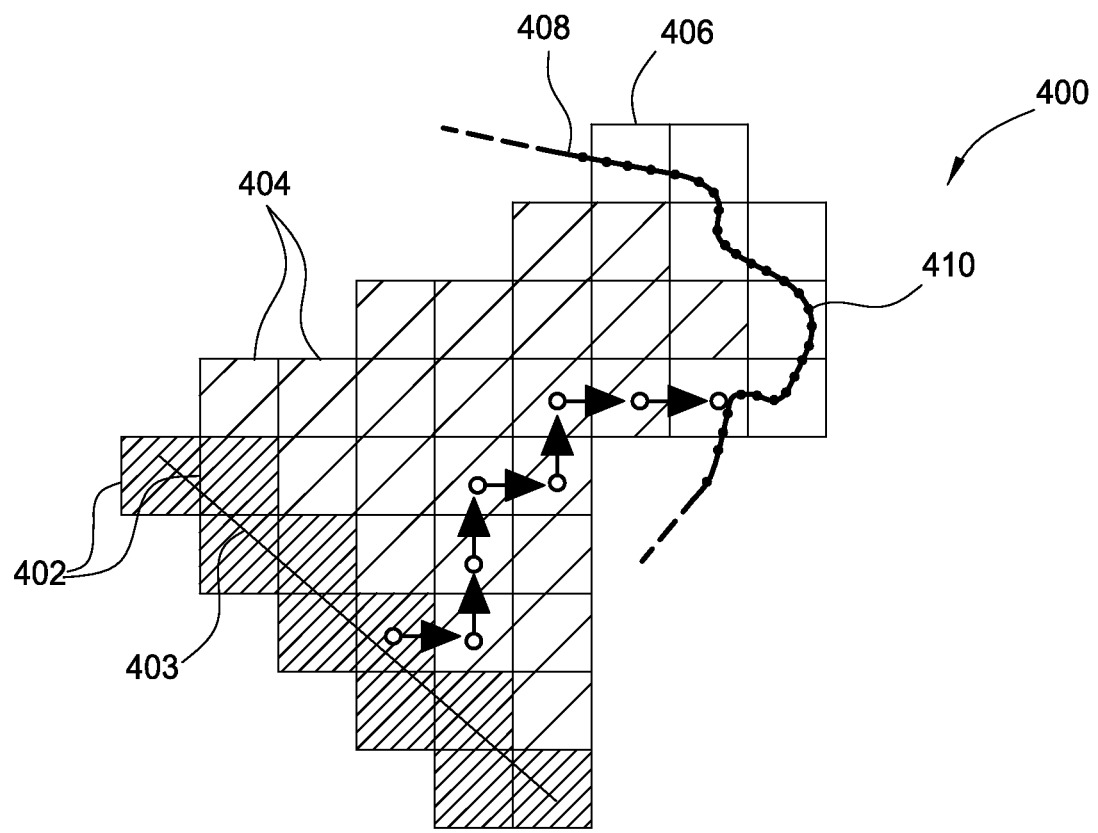
FIG. 4A is an illustration of portion of a voxelization for calculating geodesic distances, according to one embodiment of the present invention.

Once application 150 has a voxelized representation of a model with voxels classified as either internal or external, application 150 calculates geodesic distances between vertices 210 in the skin 202 and influences 206 in the transformation hierarchy 204. FIG. 4A and related discussion illustrate techniques for calculating geodesic distances for uniform voxelizations, and FIG. 4B and related discussion illustrate techniques for calculating geodesic distances for sparse voxelizations.

FIG. 4A is an illustration of a portion of a voxelization 400 for calculating geodesic distances, according to one embodiment of the present invention. As shown, the voxelization 400 includes influencer voxels 402 that intersect an influence 403, interior voxels 404, boundary voxels 406, and a skin 408, which includes vertices 410.

Geodesic distances are distances between two points through the interior of a model (as opposed to Euclidean distances, which are distances between two points without regard to whether the distances traverse the interior or exterior of a model). A geodesic distance is useful for assigning skinning weights because geodesic distances account for the structure of the model. For example, a model can include many branches, such as with a humanoid figure (e.g., the legs, arms, and head all branch off from a central entity—the trunk). By flowing through the interior of a particular three-dimensional model, the geodesic distances do not take "short cuts" through branches between space that is external to the model, and thereby roughly follow the skeleton of the model.

The geodesic distances calculated by application 150 are between vertices 410 and influences 403 (and more particularly between voxels that intersect vertices 410 and voxels that intersect influences 403). More specifically, because skinning weights are generally applied to each vertex 410 in a three-dimensional model, and because the skinning weights indicate an amount of influence of any particular influence over the distortion of the vertex 410, application 150 calculates geodesic distances between each voxel that overlaps a vertex 410 (also referred to herein as a "skin voxel") and each voxel that intersects an influence 403 (also referred to herein as an "influencer voxel" 402).

For any particular influencer voxel 402-skin voxel pair, application 150 calculates the geodesic distance between the voxels in that pair as follows. Application 150 assigns a distance of zero to all influencer voxels 402 in the voxelization 400 and assigns a distance of infinity (or some other value indicating a "maximum" distance that is not likely to be exceeded during calculation of geodesic distances) to all other non-exterior voxels in the voxelization 400. Application sets the influencer voxel 402 as the current voxel. For all voxels that are neighbors to the current voxel, application 150 calculates a proposed distance for the neighboring voxel as the Euclidean distance from the neighboring voxel to the current voxel plus the distance value of the current voxel. If the proposed distance is less than the distance value of the neighboring voxel, then application 150 sets the distance value for the neighboring voxel as the proposed distance. Otherwise, the application 150 does not modify the distance value of the neighboring voxel. Then, if the proposed distance is less than the distance value of the neighboring voxel, application 150 adds the neighboring voxel to a list of voxels to analyze. Application 150 repeats the above steps for all voxels in the list of voxels to analyze until application 150 determines that the list of voxels to analyze is empty. At that point, a distance value for the targeted skin voxel is known. The described technique is a form of Djikstra's algorithm, which is generally known to those of skill in the art.

The following table depicts a pseudo-code version of the above-described technique for calculating geodesic distance. This pseudo-code version calculates the geodesic distances for all voxels of a particular bone (influence) and also for all bones (influences) in a skeleton (transformation hierarchy).

TABLE 1

Distance Computation input: Character skeleton S and voxelized mesh V
1:    foreach bone $b_i$ of S do
         // Initialize voxel distance values
2:       foreach non-exterior voxel $v_i$ of V do
3:          $d_{vi} = \infty$;
4:       end
5:       create empty voxel queue Q;
         // Initialize bone voxels and add them to the queue
6:       foreach non-exterior voxel $v_i$ of V intersecting with $b_i$ do
7:          $dv_i = 0$;

TABLE 1-continued

Distance Computation

8:          push $v_i$ to Q;
9:       end
         // Compute geodesic distances
10:      while Q not empty do
11:         pop $v_i$ from Q;
12:         foreach non-exterior voxel neighbor $v_j$ to $v_i$ do
13:            dist = $d_{vi}$ + |$p_{vi}$ − $p_{vj}$|;
14:            if $d_{vj}$ > dist then
15:               $d_{vj}$ = dist;
16:               push $v_j$ to Q;
17:            end
18:         end
19:      end
20:   end In the pseudo-code provided above, lines 2-4 initialize the distance values for each non-exterior voxel to infinity. Lines 6-9 identify all voxels intersecting the influence, set the distance values for those intersecting voxels to zero, and push all of those voxels into a working queue. In lines 10-19, the following is performed. While the working queue is not empty, a voxel $v_i$ is dequeued. Value dist is calculated as the distance value for voxel $v_i$ plus the Euclidean distance between $p_{vi}$ (the center of voxel $v_i$) and $p_{vj}$ (the center of voxel $v_j$). For every neighboring voxel $v_j$ of voxel $v_i$ with a stored distance less than a value dist, the distance value for $v_j$ is updated as equal to value dist, and $v_j$ is added to the working queue. To calculate distance values from all influences to all vertices, the algorithm may be performed in parallel by multiple execution units. Once the distances between all voxels that overlap a particular influence and a particular vertex have been calculated, application 150 may determine a shortest distance between the vertex and the influence by simply selecting the lowest value of all influencer voxel-to-vertex distances associated with that influence and that vertex.

Figure 4B:
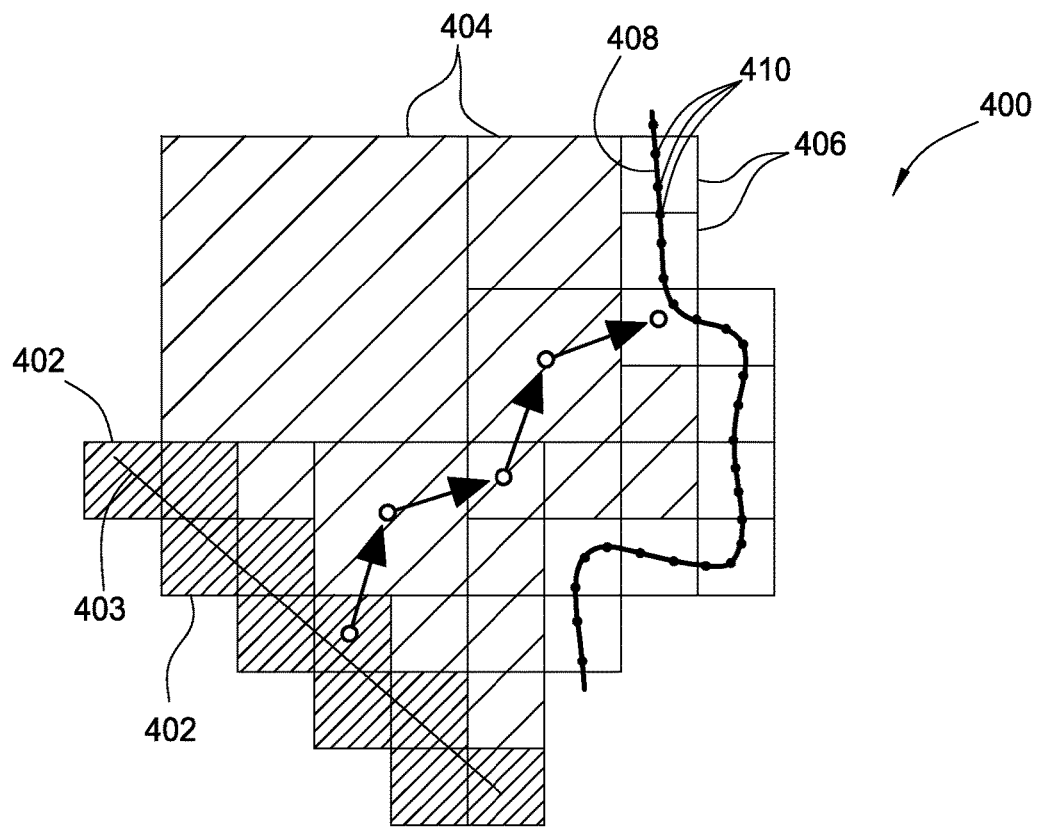
FIG. 4B is an illustration of a portion of a non-uniform voxelization for calculating geodesic distances, according to another embodiment of the present invention.

FIG. 4B is an illustration of a portion of a non-uniform voxelization 450 for calculating geodesic distances, according to another embodiment of the present invention. As shown, the non-uniform voxelization includes influencer voxels 402, interior voxels 404, boundary voxels 406, and a skin 408, which includes vertices 410. The influencer voxels 402 represent voxels that intersect influences 206 of the transformation hierarchy 204 in the three-dimensional model associated with the voxelization.

For the non-uniform voxelization depicted in FIG. 4B, the distance calculation would be the same as for the uniform voxelization. More specifically, application 150 would initialize each distance value for each voxel as with the uniform voxelization illustrated in FIG. 4A, and distances would be calculated also as described above.

In some embodiments, application 150 disfavors including boundary voxels 406 in the middle of the path between influencer voxels 402 and boundary voxels 406 by applying a multiplicative weight to the distance value for boundary voxels 406. The following pseudo-code illustrates techniques for disfavoring boundary voxels 406.

TABLE 2

Distance Computation with Boundary Voxel Disfavor input: Character skeleton S and voxelized mesh V
1:    foreach bone $b_i$ of S do
         // Initialize voxel distance values
2:       foreach non-exterior voxel $v_i$ of V do

TABLE 2-continued

Distance Computation with Boundary Voxel Disfavor

```
 3:            d_vi = ∞;
 4:         end
 5:         create empty voxel queue Q;
            // Initialize bone voxels and add them to the queue
 6:         foreach non-exterior voxel v_i of V intersecting with b_i do
 7:            dv_i = 0;
 8:            push v_i to Q;
 9:         end
            // Compute geodesic distances
10:         while Q not empty do
11:            pop v_i from Q;
12:            foreach non-exterior voxel neighbor v_j to v_i do
13:               β = 1;
14:               if v_j is boundary then
15:                  β = ∈_penalty;
16:               end
17:               dist = d_vi + β|p_vi − p_vj|;
18:               if d_vj > dist then
19:                  d_vj = dist;
20:                  push v_j to Q;
21:               end
22:            end
23:         end
24:      end
```

The pseudo-code provided in Table 2 is similar to the pseudo-code of Table 1, except that the dist value is calculated as the sum of the distance value for the current voxel ($d_{vi}$) added to β multiplied by the Euclidean distance between the center of the current voxel (pvi) and the center of the neighboring voxel (pvj). Beta is a value that is either 1 or $\epsilon_{penalty}$, depending on whether the neighboring voxel is a boundary voxel. $\epsilon_{penalty}$ is a value that can be adjusted by, for example, a programmer, and determines the degree by which boundary voxels are disfavored. Techniques for disfavoring boundary voxels may be applied in association with either uniform voxelizations or sparse voxelizations.

Calculating Skinning Weights

Once application 150 has calculated geodesic distances, application calculates skinning weights based on the geodesic distances. Generally, the value of a skinning weight is greater when a geodesic distance is lower and lower when a geodesic distance is higher (closer influences contribute a greater degree to the deformation of vertices 210 than farther influences do). In some embodiments, application 150 calculates weights with a falloff function having the property that the weight value drops dramatically (e.g., exponentially) with distance between influencer voxel 402 and boundary voxel 406. Additionally, in some embodiments, application 150 adds the Euclidean distance from the center of the boundary voxel 406 to the vertex 410 at issue to the distance between the boundary voxel 406 and the influencer voxel 402 in order to obtain a more accurate measure of influence-to-vertex distance. Such a distance is referred to herein as a "influence-to-vertex-position distance."

In one embodiment, application 150 applies the following equations to calculate skinning weights, where d is a influence-to-vertex-position distance for a particular vertex-influence pair, α, λmin, and λmax are programmer-selectable parameters for controlling bind smoothness, and ω is the skinning weight, described above:

$$\lambda = (1-\alpha)\lambda min + \alpha \lambda max$$

$$\omega = (d)^{-\lambda}$$

In another embodiment, application 150 applies the following equations to calculate skinning weights:

$$\omega = ((1-\alpha)(d) + \alpha(d)^2)^{-2}$$

In some embodiments, application 150 calculates weights for some or all influence-vertex pairs as described above. These weights can then be applied to the associated three-dimensional model to allow associated vertex deformation during animation of the model.

Figure 5:
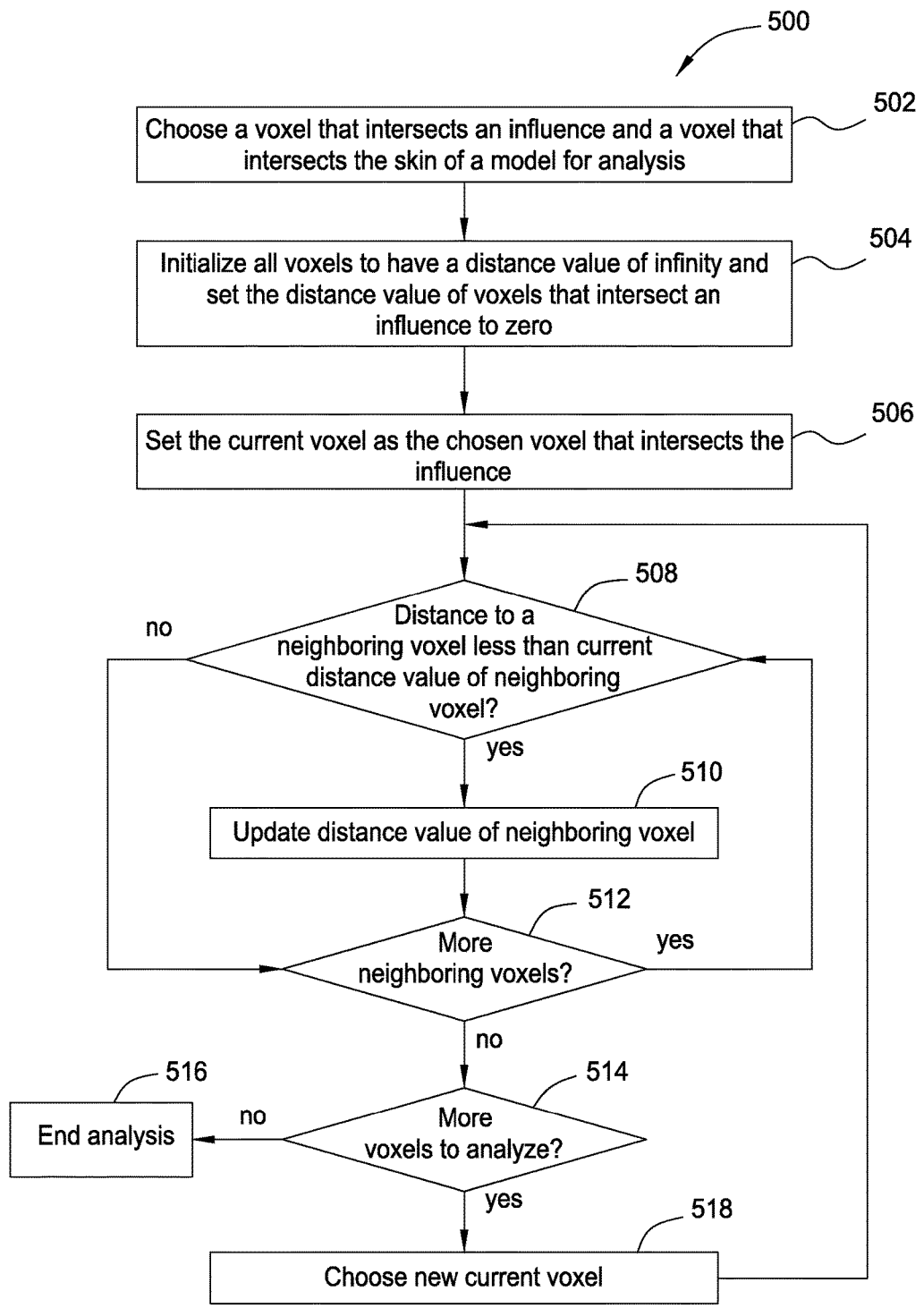
FIG. 5 is a flow diagram of method steps for calculating geodesic distances based on a voxelization of a model, according to one embodiment of the present invention.

FIG. 5 is a flow diagram of method steps for calculating geodesic distances based on a voxelized representation of a model, according to one embodiment of the present invention. Although the steps are described in conjunction with FIGS. 1-4B, persons skilled in the art will understand that any system configured to perform the method steps, in any order, falls within the scope of the present invention.

As shown, a method 500 begins at step 502, in which application 150 chooses a voxel that intersects an influence and a voxel that intersects the skin of a model for analysis. In step 504, application 150 initializes all voxels to have a distance value of infinity and sets the distance value of voxels that intersect the influence to zero. In step 506, application 150 sets the current voxel as the chosen voxel that intersects the influence. In step 508, application 150 determines whether the distance to a neighboring voxel is less than the current distance value of the neighboring voxel. If the distance is less than the current distance value, then the method proceeds to step 510. If the distance is not less than the current distance value, then the method proceeds to step 512.

In step 510, application 150 updates the distance value of the neighboring voxel. In step 512, application 150 determines whether there are more neighboring voxels. If there are more neighboring voxels, then the method returns to step 508. If there are no more neighboring voxels, then the method proceeds to step 514. In step 514, application determines whether there are more voxels to analyze. If there are more voxels to analyze, then the method proceeds to step 518. If there are no more voxels to analyze, then the method proceeds to step 516, in which in which application 150 ends the analysis. In step 518, the method chooses a new current voxel. After step 518, the method returns to step 508.

In sum, application 150 automatically calculates skinning weights by using a voxelized representation of a three-dimensional model. The application calculates geodesic distances based on the voxelization and assigns weights based on the geodesic distances. Application 150 begins with a particular influencer voxel and examines neighboring voxels to determine whether the distance between the influencer voxel and the neighboring voxel is less than a stored distance value for that neighboring voxel. If the distance is less than the stored value, then application 150 replaces the stored value with the distance. Application 150 repeats these steps and until arriving at the target skin voxel.

Once geodesic distances are generated, application 150 determines skinning weights based on the geodesic distances. More specifically, application 150 applies a function that generates a lower weight for further distances.

One advantage of the disclosed techniques is that application automatically generates skinning weights for skinning a three-dimensional model, which reduces the amount of time needed to animate models. Another advantage is that the techniques generate weights that produce improved deformations of model skins, which improves the quality of resulting animations.

Although the application 150 is described herein as performing both the animating procedures for deforming of the skin 202 in response to movement of the influences 206, and the other calculations provided herein, those of skill in the art would understand that different applications could perform various functionality described herein.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A computer-implemented method for computing skinning weights, the method comprising:
    traversing, via a processor, a plurality of paths from a first voxel included in a voxelization associated with a three-dimensional model to a second voxel included in the voxelization, wherein the first voxel intersects a first influence included in the three-dimensional model, and the second voxel intersects a target vertex associated with the three-dimensional model, wherein the voxelization includes a set of interior voxels, wherein the first voxel and the second voxel are included in the set of interior voxels, and wherein each of the plurality of paths comprises voxels that are included in the set of interior voxels;
    computing a first distance value associated with a first path in the plurality of paths indicating a distance between the first voxel and the second voxel within the first path;
    computing a second distance value associated with a second path in the plurality of paths indicating a second distance between the first voxel and the second voxel within the second path, wherein the second distance value is less than the first distance value;
    determining that the second path includes a boundary voxel located between the first voxel and the second voxel, wherein the boundary voxel intersects a boundary of the three-dimensional model;
    responsive to determining that the second path includes the boundary voxel, increasing the second distance value by applying a multiplicative weight to the second distance value;
    determining, via the processor, that the first path represents the shortest distance between the first voxel and the second voxel across the plurality of paths;
    assigning, via the processor, a skinning weight to the target vertex based on the first distance value; and
    generating, via the processor, an animation based on the skinning weight.

2. The computer-implemented method of claim 1, wherein traversing the plurality of paths comprises:
    initializing a first set of one or more voxels included in the set of interior voxels to have a distance value of a maximum distance value;
    initializing a second set of one or more voxels included in the set of interior voxels that intersect an influence to have an assigned distance value of zero; and
    identifying a third set of one or more voxels associated with the three-dimensional model that border the first voxel and have a distance value that is greater than a distance value related with the first voxel.

3. The computer-implemented method of claim 2, wherein traversing the plurality of paths further comprises updating one or more additional distance values related to the voxels included in the third set of one or more voxels based on a set of one or more distances from the voxels included in the third set of one or more voxels to the first voxel.

4. The computer-implemented method of claim 3, further comprising repeating the steps of identifying the one or more voxels and updating the one or more additional distance values in order to traverse from the first voxel, through intermediate voxels, to the second voxel.

5. The computer-implemented method of claim 1, wherein traversing the plurality of paths comprises:
    adding an influencer voxel associated with the three-dimensional model to a work queue for analysis;
    setting a voxel in the work queue as the current voxel;
    identifying a neighboring voxel of the current voxel;
    determining that a calculated distance between the neighboring voxel and the first voxel is less than a distance value related to the neighboring voxel;
    setting the distance value related to the neighboring voxel to be the calculated distance; and
    adding the neighboring voxel to the work queue.

6. The computer-implemented method of claim 5, wherein traversing the plurality of paths further comprises repeating the first setting, identifying, determining, second setting, and adding steps for each other neighboring voxel associated with the influencer voxel.

7. The computer-implemented method of claim 1, further comprising repeating the traversing and identifying steps for all voxels included in the set of interior voxels that intersect the first influence to determine a set of shortest distance values from each voxel intersecting the first influence to the target vertex.

8. The computer-implemented method of claim 7, wherein assigning the skinning weight to the target vertex comprises identifying the shortest distance value within the set of shortest distance values and calculating the skinning weight based on the shortest distance value.

9. The computer-implemented method of claim 8, wherein calculating the skinning weight comprises applying a fall-off function to the shortest distance value.

10. A computing device for computing skinning weights, the computing device comprising:
    a memory including instructions; and
    a processor that is coupled to the memory and, when executing the instructions, is configured to:
        traverse a plurality of paths from a first voxel included in a voxelization associated with a three-dimensional model to a second voxel included in the voxelization, wherein the first voxel intersects a first influence included in the three-dimensional model, and the second voxel intersects a target vertex associated with the three-dimensional model, wherein the voxelization includes a set of interior voxels, wherein the first voxel and the second voxel are included in the set of interior voxels, and wherein each of the plurality of paths comprises voxels that are included in the set of interior voxels;

compute a first distance value associated with a first path in the plurality of paths indicating a distance between the first voxel and the second voxel within the first path;

compute a second distance value associated with a second path in the plurality of paths indicating a second distance between the first voxel and the second voxel within the second path, wherein the second distance value is less than the first distance value;

determine that the second path includes a boundary voxel located between the first voxel and the second voxel, wherein the boundary voxel intersects a boundary of the three-dimensional model;

responsive to determining that the second path includes the boundary voxel, increase the second distance value by applying a multiplicative weight to the second distance value;

determine that the first path represents the shortest distance between the first voxel and the second voxel across the plurality of paths;

assign, via the processor, a skinning weight to the target vertex based on the first distance value; and generate, via the processor, an animation based on the skinning weight.

11. The computing device of claim 10, wherein in order to traverse the plurality of paths, the processor is further configured to:

initialize a first set of one or more voxels included in the set of interior voxels to have a distance value of a maximum distance value;

initialize a second set of one or more voxels included in the set of interior voxels that intersect an influence to have an assigned distance value of zero; and identify a third set of one or more voxels associated with the three-dimensional model that border the first voxel and have a distance value that is greater than the distance value related with the first voxel.

12. The computing device of claim 10, wherein in order to traverse the plurality of paths, the processor is further configured to:

add an influencer voxel associated with the three-dimensional model to a work queue for analysis;

set a voxel in the work queue as the current voxel;

identify a neighboring voxel of the current voxel;

determine that a calculated distance between the neighboring voxel and the first voxel is less than a distance value related to the neighboring voxel;

set the distance value related to the neighboring voxel to be the calculated distance; and add the neighboring voxel to the work queue.

13. The computing device of claim 12, wherein in order to traverse the plurality of paths, the processing system is further configured to repeat the first setting, identifying, determining, second setting, and adding for each other neighboring voxel associated with the influencer voxel.

14. The computing device of claim 10, wherein the processing system is further configured to repeat the traversing and identifying for all voxels included in the set of interior voxels that intersect the first influence to determine a set of shortest distance values from each voxel intersecting the first influence to the target vertex.

15. The computing device of claim 14, wherein in order to assign the skinning weight to the target vertex, the processing system is configured to identify the shortest distance value within the set of shortest distance values and calculating the skinning weight based on the shortest distance value.

16. A non-transitory computer-readable medium storing instructions that, when executed by a processor, cause the processor to perform the steps of:

traversing a plurality of paths from a first voxel included in a voxelization associated with a three-dimensional model to a second voxel included in the voxelization, wherein the first voxel intersects a first influence included in the three-dimensional model, and the second voxel intersects a target vertex associated with the three-dimensional model, wherein the voxelization includes a set of interior voxels, wherein the first voxel and the second voxel are included in the set of interior voxels, and wherein each of the plurality of paths comprises voxels that are included in the set of interior voxels;

computing a first distance value associated with a first path in the plurality of paths indicating a distance between the first voxel and the second voxel within the first path;

computing a second distance value associated with a second path in the plurality of paths indicating a second distance located between the first voxel and the second voxel within the second path, wherein the second distance value is less than the first distance value;

determining that the second path includes a boundary voxel between the first voxel and the second voxel, wherein the boundary voxel intersects a boundary of the three-dimensional model;

responsive to determining that the second path includes the boundary voxel, increasing the second distance value by applying a multiplicative weight to the second distance value;

determining that the first path represents the shortest distance between the first voxel and the second voxel across the plurality of paths;

assigning a skinning weight to the target vertex based on the first distance value; and generating, via the processor, an animation based on the skinning weight.

17. The non-transitory computer-readable medium of claim 16, wherein traversing the plurality of paths comprises:

initializing a first set of one or more voxels included in the set of interior voxels to have a distance value of a maximum distance value;

initializing a second set of one or more voxels included in the set of interior voxels that intersect an influence to have an assigned distance value of zero; and identifying a third set of one or more voxels associated with the three-dimensional model that border the first voxel and have a distance value that is greater than a distance value related with the first voxel.

18. The non-transitory computer-readable medium of claim 16, wherein traversing plurality of paths comprises:

adding an influencer voxel associated with the three-dimensional model to a work queue for analysis;

setting a voxel in the work queue as the current voxel;

identifying a neighboring voxel of the current voxel;

determining that a calculated distance between the neighboring voxel and the first voxel is less than a distance value related to the neighboring voxel;

setting the distance value related to the neighboring voxel to be the calculated distance; and adding the neighboring voxel to the work queue.

19. The non-transitory computer-readable medium of claim 16, further including instructions that, when executed by the processor, cause the processor to repeat the traversing and identifying steps for all voxels included in the set of interior voxels that intersect the first influence to determine a set of shortest distance values from each voxel intersecting the first influence to the target vertex.

20. The non-transitory computer-readable medium of claim 19, wherein assigning the skinning weight to the target vertex comprises identifying the shortest distance value within the set of shortest distance values and calculating the skinning weight based on the shortest distance value.

* * * * *